(12) United States Patent
Morosawa et al.

(10) Patent No.: US 12,522,179 B2
(45) Date of Patent: Jan. 13, 2026

(54) VEHICLE CONTROL APPARATUS, VEHICLE CONTROL METHOD, AND STORAGE MEDIUM

(71) Applicant: HONDA MOTOR CO., LTD., Tokyo (JP)

(72) Inventors: Ryo Morosawa, Tokyo (JP); Mitsunori Nishino, Tokyo (JP); Seonghun Lee, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 7 days.

(21) Appl. No.: 18/410,210

(22) Filed: Jan. 11, 2024

(65) Prior Publication Data
US 2024/0294141 A1    Sep. 5, 2024

(30) Foreign Application Priority Data
Mar. 3, 2023    (JP) ................. 2023-032496

(51) Int. Cl.
| | | |
|---|---|---|
| *B60R 25/30* | (2013.01) | |
| *B60R 25/104* | (2013.01) | |
| *B60R 25/31* | (2013.01) | |
| *H04N 23/611* | (2023.01) | |

(52) U.S. Cl.
CPC .......... *B60R 25/305* (2013.01); *B60R 25/104* (2013.01); *B60R 25/31* (2013.01); *H04N 23/611* (2023.01)

(58) Field of Classification Search
CPC .... B60Q 1/0023; B60Q 1/247; B60Q 1/2607; B60Q 1/323; B60Q 2400/40; B60Q 2900/30; B60R 25/245; B60R 25/01; B60R 25/246; B60R 25/241; B60R 25/243; B60R 25/1001; B60R 25/1003; B60R 25/2009; B60R 25/305; B60R 25/307; B60R 25/31; B60R 25/104; G06T 7/70; G06V 20/56;
(Continued)

(56) References Cited

U.S. PATENT DOCUMENTS

| | | | |
|---|---|---|---|
| 2015/0120151 A1* | 4/2015 | Akay ................ | B60R 25/01 701/1 |
| 2017/0166169 A1* | 6/2017 | Müller ............... | G07C 9/00309 |
| 2018/0137381 A1* | 5/2018 | McNabb ............. | B60R 25/245 |

(Continued)

FOREIGN PATENT DOCUMENTS

JP    2022-161229 A    10/2022

*Primary Examiner* — Nathnael Aynalem
(74) *Attorney, Agent, or Firm* — Rankin, Hill & Clark LLP

(57) ABSTRACT

A vehicle control apparatus includes: an approach detection section; an authentication section; and a start control section. The approach detection section detects a person within a rear detection range and a lateral detection range. The rear detection range includes an area in a rear direction of a vehicle. The lateral detection range includes an area within a range different from the rear detection range. The authentication section authenticates a person detected as a user of the vehicle by using an image captured. The start control section starts the image capturing unit when the person detected within the lateral detection range approaches a position closer than a setting distance from the vehicle, and starts the image capturing unit even when a distance between the person detected within the rear detection range and the vehicle is greater than or equal to the setting distance.

7 Claims, 8 Drawing Sheets

(58) Field of Classification Search
CPC ...... G06V 20/58; G06V 20/52; H04N 23/611; H04N 23/61; B60W 2050/143
USPC .................................. 348/148; 340/5.2, 5.72
See application file for complete search history.

(56) References Cited

U.S. PATENT DOCUMENTS

| | | | |
|---|---|---|---|
| 2018/0290627 A1* | 10/2018 | Hariri | B60R 25/245 |
| 2019/0024430 A1* | 1/2019 | Jeromin | E05F 15/40 |
| 2021/0248389 A1* | 8/2021 | Liu | H04N 7/188 |
| 2022/0030384 A1* | 1/2022 | Hasegawa | B60R 25/31 |

* cited by examiner

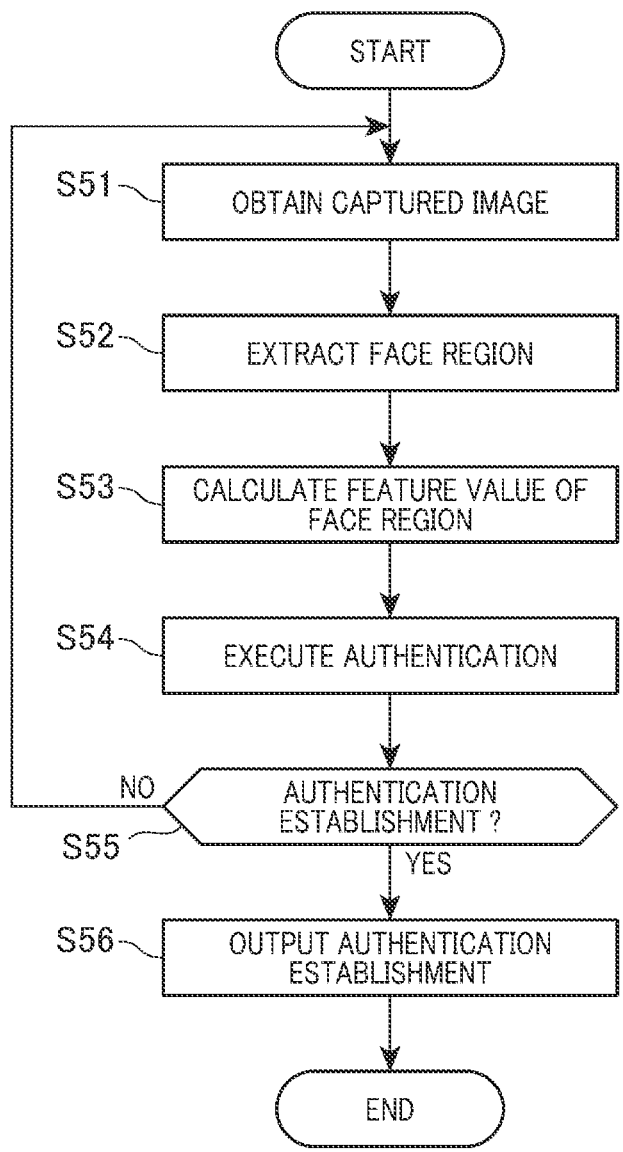

VEHICLE CONTROL APPARATUS, VEHICLE CONTROL METHOD, AND STORAGE MEDIUM

INCORPORATION BY REFERENCE

The present application claims priority under 35 U.S.C. § 119 to Japanese Patent Application No. 2023-032496 filed on Mar. 3, 2023. The content of the application is incorporated herein by reference in its entirety.

BACKGROUND OF THE INVENTION

Field of the Invention

The present invention relates to a vehicle control apparatus, a vehicle control method, and a storage medium.

Description of the Related Art

In recent years, more active efforts have been made to provide access to a sustainable transportation system that takes into consideration even people at vulnerable positions such as elderly people and children among traffic participants. To achieve this, efforts have been invested in research and development for still further improving traffic safety and convenience by developing the easiness of getting in and out of vehicles. As this type of technology, for example, technology has been proposed that determines the distance from a remote control key to a vehicle on the basis of positional information related to the remote control key and unlocks a door of the vehicle (see, for example, Japanese Patent Laid-Open No. 2022-161229).

A user who is about to get in a vehicle may move in a variety of ways. This makes it difficult to respond to the timing at which the user reaches the vehicle even by using the distance between the user and the vehicle.

To solve the problem described above, an object of the present application is to bring the vehicle into operation at an appropriate timing in response to the user coming closer to the vehicle. This eventually contributes to the development of a sustainable transportation system.

SUMMARY OF THE INVENTION

An aspect for achieving the object described above is a vehicle control apparatus including: an approach detection section; an authentication section; and a start control section. The approach detection section is configured to detect a person within a rear detection range and a lateral detection range. The rear detection range includes an area in a rear direction of a vehicle. The lateral detection range includes an area within a range different from the rear detection range. The authentication section is configured to authenticate a person detected by the approach detection section as a user of the vehicle by using an image captured by an image capturing unit mounted on the vehicle. The start control section is configured to start, in a case where the approach detection section detects a person within the lateral detection range, the image capturing unit when the person detected within the lateral detection range approaches a position closer than a setting distance from the vehicle, and start, in a case where a person is detected within the rear detection range, the image capturing unit even when a distance between the person detected within the rear detection range and the vehicle is greater than or equal to the setting distance.

Advantageous Effects of Invention

The vehicle control apparatus described above makes it possible to start an image capturing unit at an earlier timing when a user comes closer to a vehicle through an area in a rear direction of the vehicle, and execute authentication by using a captured image. This makes it possible to perform an operation, for example, in accordance with the movement of the user such as completing authentication before the user reaches the vehicle. This makes it possible to bring the vehicle into operation at an appropriate timing in response to the user coming closer to the vehicle and eventually contribute to the development of a sustainable transportation system.

BRIEF DESCRIPTION OF THE DRAWINGS

FIG. 8 is a flowchart illustrating an operation of the vehicle control apparatus.

DETAILED DESCRIPTION OF THE PREFERRED EMBODIMENTS

[1. Configurations of Vehicle and Sensing Range]

Figure 1:
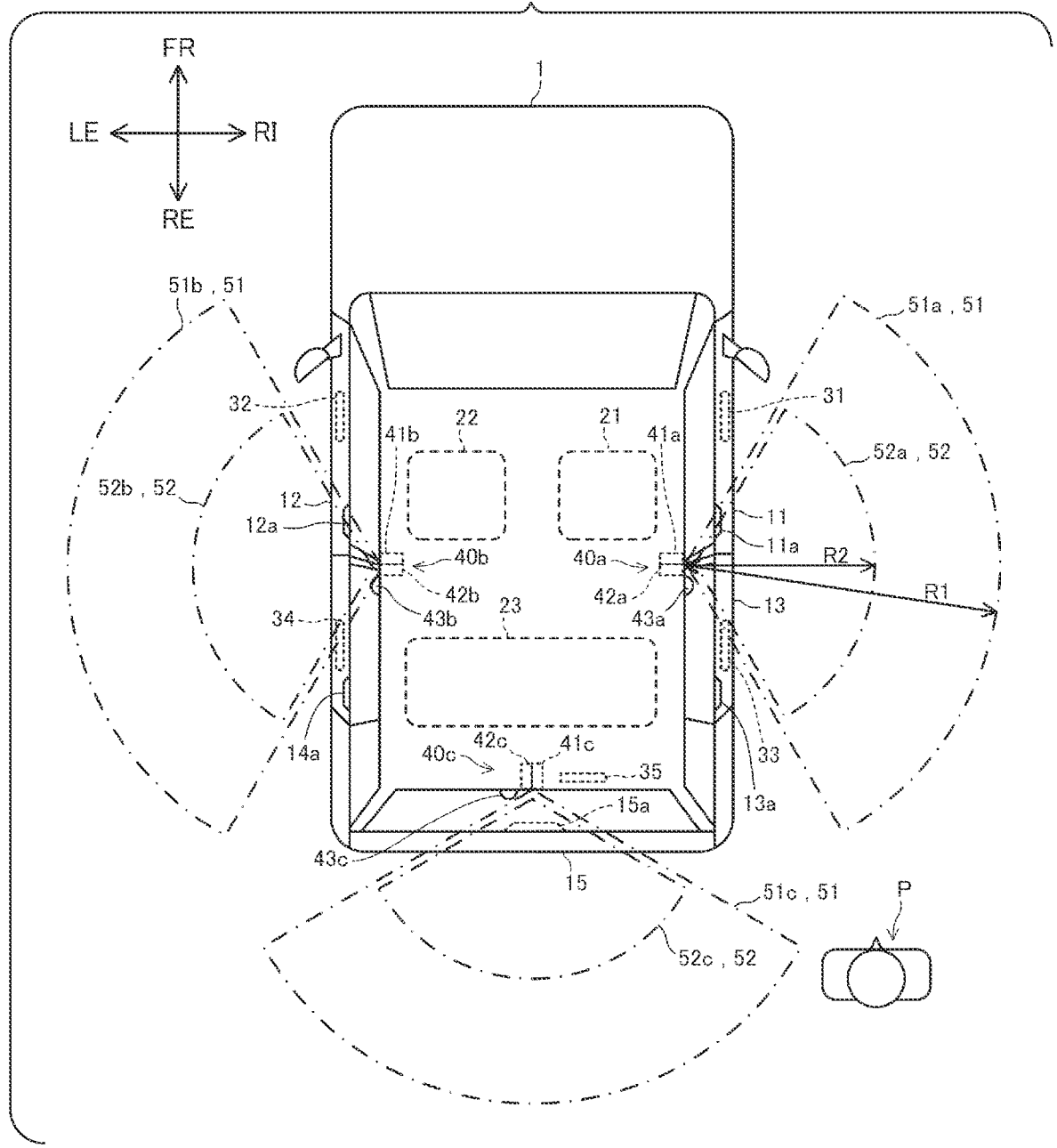
FIG. 1 is a plan view illustrating a configuration of a vehicle and a sensing range.
Figure 2:
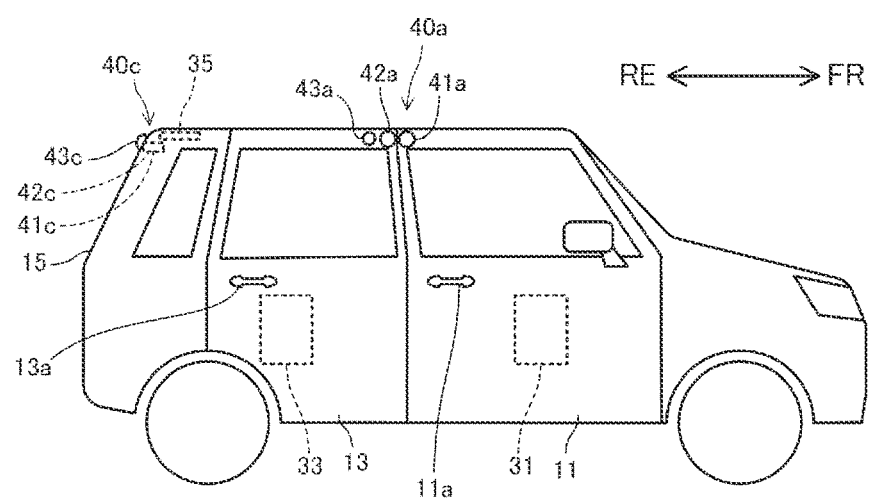
FIG. 2 is a side view illustrating the configuration of the vehicle.

A configuration of each of units of a vehicle 1 mounted with a vehicle control apparatus 100 according to the present embodiment will be described with reference to FIGS. 1 and 2. FIG. 1 is a plan view illustrating a configuration of the vehicle 1 and a sensing range 51. FIG. 2 is a side view illustrating the configuration of the vehicle 1.

In the present embodiment, a description will be given by using, as an example, a case where the vehicle 1 mounted with the vehicle control apparatus 100 is a four-wheeled automobile including a plurality of openable and closeable objects as illustrated in each of FIGS. 1 and 2. Specifically, the vehicle 1 is a hatchback automobile including a front door 11, a front door 12, a rear door 13, a rear door 14, and a rear gate 15 as openable and closeable objects. This is an example and it is sufficient if the vehicle 1 is a mobile object that includes an openable and closeable object and allows a user to climb up and down by opening the openable and closeable object. The vehicle 1 may include any number of openable and closeable objects and the size and application of the vehicle 1, the type of a driving source, the specifications of a wheel, and the like are not limited. In addition, the openable and closeable object is an openable and closeable member that is provided on an outer surface of the vehicle 1 and particularly refers to a member that is opened and closed for the purpose of allowing a person P to climb up into the vehicle 1 and climb down from the vehicle 1 and the purpose of allowing the person P to load luggage into the vehicle 1 and unload luggage from the vehicle 1.

Although described in detail below, the vehicle control apparatus 100 is an apparatus or a device that includes a processor, a memory, an interface circuit, and the like and controls the actuation of the vehicle 1. The vehicle control apparatus 100 is, for example, an electronic control unit (ECU).

In each of FIGS. 1 and 2, the respective directions of the front, rear, right, and left of the vehicle 1 are denoted by reference signs FR, RE, RI, and LE. The front direction FR is the traveling direction of the traveling vehicle 1 and the rear direction RE is the direction of the vehicle 1 that is backing up. The vehicle 1 includes a driver's seat 21, a passenger seat 22, and a back seat 23 as seats on which occupants (users) sit down. In the present embodiment, the driver's seat 21 on which a user who is a driver sits down is disposed on the right side of the vehicle 1 and the passenger seat 22 is disposed on the left side of the vehicle 1, but this is an example. The driver's seat 21 and the passenger seat 22 may be each disposed on the opposite side in accordance with the specifications of the vehicle 1.

The front door 11 is provided in the front of the vehicle 1 on the right side surface and the rear door 13 is provided in the rear direction of the front door 11. The front door 12 is provided in the front of the vehicle 1 on the left side surface and the rear door 14 is provided in the rear direction of the front door 12. The front doors 11 and 12 are respectively provided with door handles 11a and 12a. The rear doors 13 and 14 are respectively provided with door handles 13a and 14a and a door handle 15a is attached to the rear gate 15. Each of the door handles 11a, 12a, 13a, 14a, and 15a is a handle that a user grasps to open the door.

The front door 11 is opened and closed when a user who takes the driver's seat 21 climbs up and down and the front door 12 is opened and closed when a user who takes the passenger seat 22 climbs up and down. The rear door 13 and the rear door 14 are each opened and closed, for example, when a user who takes the back seat 23 climbs up and down and when a user who takes the driver's seat 21 or the passenger seat 22 puts luggage on the back seat 23. The rear gate 15 is a door provided at the rear end of the vehicle 1 and is opened and closed for allowing a user to put luggage in the luggage space in the rear of the vehicle body of the vehicle 1.

Figure 3:
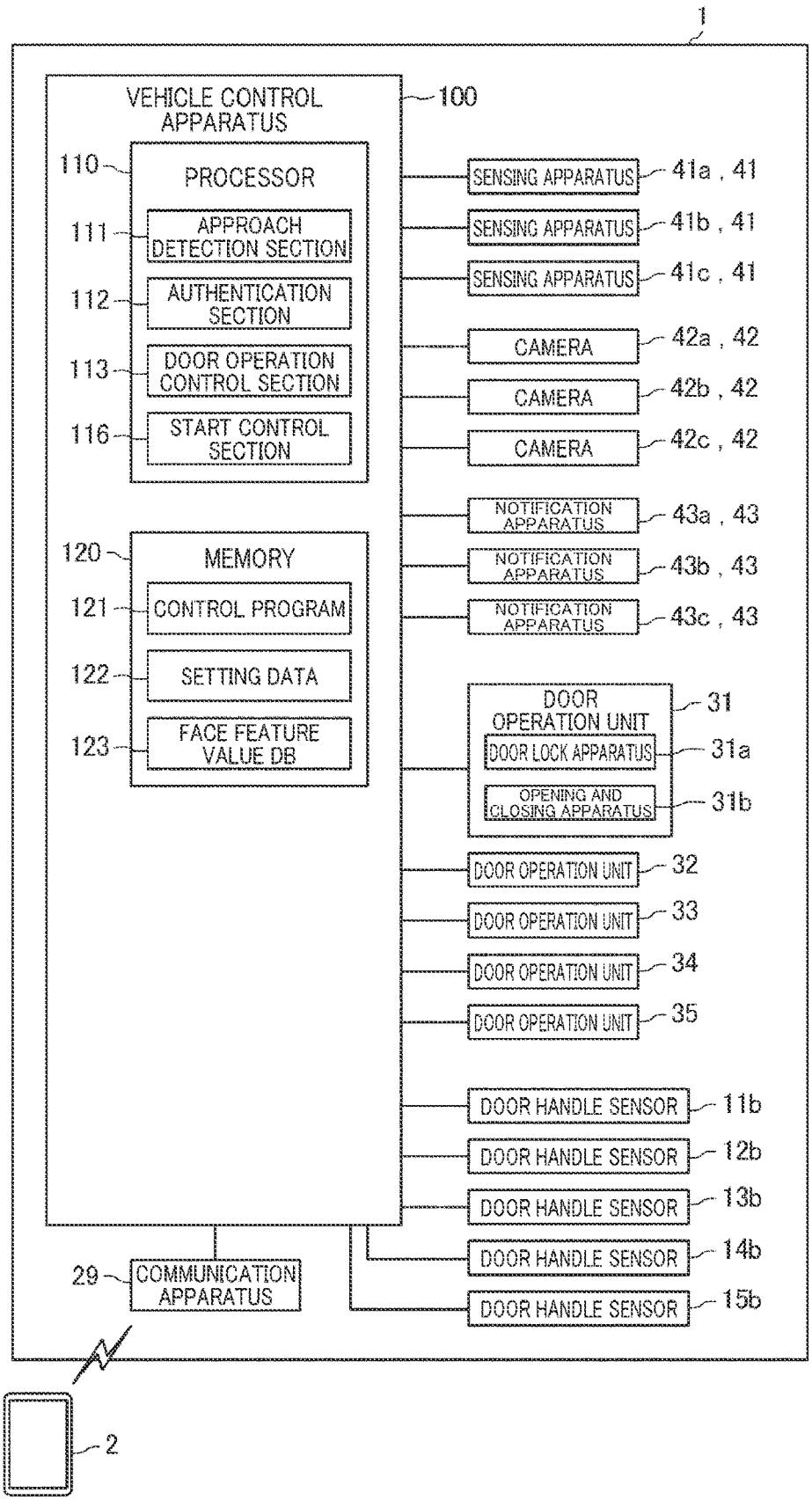
FIG. 3 is a block diagram of a control system of the vehicle.

The front door 11 incorporates a door operation unit 31. The door operation unit 31 includes a door lock apparatus that releases and sets the door lock of the front door 11 as described below. In addition, the door operation unit 31 may include an apparatus that opens the front door 11 with the motive power of a motor or an actuator and the door operation unit 31 may further include an apparatus that closes the front door 11 with motive power. In the present embodiment, a configuration is exemplified in which the door operation unit 31 includes a door lock apparatus 31a and an opening and closing apparatus 31b as illustrated in FIG. 3. The door lock apparatus 31a is an apparatus that locks the front door 11 to prevent the door from opening, and sets and releases the lock in accordance with the control of the vehicle control apparatus 100. The opening and closing apparatus 31b includes an unillustrated motor or actuator and performs an opening operation of opening the front door 11 and a closing operation of closing the front door 11.

The front door 12 incorporates a door operation unit 32, the rear door 13 incorporates a door operation unit 33, and the rear door 14 incorporates a door operation unit 34. The rear gate 15 incorporates a door operation unit 35. The door operation units 32, 33, 34, and 35 each include an apparatus that sets and releases the door lock as with the door operation unit 31. The door operation unit 32 also includes an apparatus that performs an opening operation and a closing operation on the front door 12 as with the door operation unit 31. The same applies to the door operation units 33, 34, and 35. Each of the door operation units 31, 32, 33, 34, and 35 corresponds to an example of an openable and closeable object operation unit.

The vehicle 1 has a so-called smart entry function of performing authentication as to whether or not the person P is a user registered in advance when the person P approaches the vehicle 1 and, for example, releasing the door lock of the front door 12 of the vehicle 1 when the authentication is established.

As the smart entry function, the vehicle 1 detects the person P who approaches the vehicle 1 from the right direction, the left direction, or the rear direction of the vehicle 1 and performs authentication as to a user of the vehicle 1 registered in advance. The authentication as to a user refers to the authentication of the detected person P as a registered user of the vehicle 1. As components that detect and authenticate the person P, the vehicle 1 includes detection units 40a, 40b, and 40c.

The detection unit 40a is disposed on the right side surface of the vehicle 1. In the configuration of each of FIGS. 1 and 2, the detection unit 40a is buried and installed in the outer surface of the center pillar of the vehicle 1 between the front door 11 and the rear door 13. The detection unit 40b is disposed on the left side surface of the vehicle 1. The detection unit 40b is positioned between the front door 12 and the rear door 14, and buried and installed, for example, in the outer surface of the center pillar of the vehicle 1. The detection unit 40c is disposed on the rear surface of the vehicle 1. For example, the detection unit 40c is buried and installed in the upper portion of the rear gate 15.

As illustrated in FIG. 2, the detection unit 40a includes a sensing apparatus 41a, a camera 42a, and a notification apparatus 43a. The sensing apparatus 41a senses the presence of the person P within a sensing range 51a in the right direction of the vehicle 1. As a specific configuration of the sensing apparatus 41a, a passive infrared ray (PIR) sensor, a camera, a radar, or another apparatus is usable. As the radar, a millimeter wave radar that uses, for example, a frequency band of 30 GHz to 300 GHz is usable. A range within which the sensing apparatus 41a is capable of sensing the person P is set, for example, to allow the sensing apparatus 41a to sense the person P within a range of about 90° to 180° in the horizontal direction and about 90° to 150° in the vertical direction within a distance R1 from the sensing apparatus 41a. In this case, the range within which the sensing apparatus 41a is capable of sensing the person P is the fan-shaped sensing range 51a illustrated in FIG. 1.

The camera 42a is a color or monochrome digital camera. The vehicle control apparatus 100 authenticates the person P as a registered user by checking an image captured by the camera 42a against a face image of a person registered as a user of the vehicle 1 in advance. The position of the person P at which the vehicle control apparatus 100 is capable of authentication is described as an authentication range 52a. The fan-shaped authentication range 52a illustrated in FIG. 1 is, for example, a range of about 90° to 150° in the horizontal direction and about 90° to 150° in the vertical direction within a distance R2 from the camera 42a. A radius R1 of the sensing range 51a is longer than a radius R2 of the authentication range 52a. That is, when the person P approaches the vehicle 1, the person P first enters the sensing range 51a to be sensed by the sensing apparatus 41a. When the person P enters the authentication range 52a after that, the vehicle control apparatus 100 uses the camera 42a to authenticate the person P.

The notification apparatus 43a issues a notification of the operation state of the detection unit 40a. The notification apparatus 43a is an indicator including, for example, a light emitting diode (LED), an organic EL illumination element, or another illuminant. The notification apparatus 43a is on or is blinking, for example, while the camera 42a is shooting an image in accordance with the control of the vehicle control apparatus 100. This makes it possible to inform the person P outside the vehicle 1 of the operation state of the detection unit 40a.

The detection unit 40b includes a sensing apparatus 41b and a camera 42b as with the detection unit 40a. In addition, the detection unit 40c includes a sensing apparatus 41c and a camera 42c. For example, the sensing apparatuses 41b and 41c each have a configuration common to that of the sensing apparatus 41a. In this case, a sensing range 51b that is a range within which the sensing apparatus 41b senses the person P and a sensing range 51c that is a range within which the sensing apparatus 41c senses the person P are the same as the sensing range 51a in shape and size. In addition, for example, the cameras 42b and 42c each have a configuration common to that of the camera 42a. In this case, an authentication range 52b that is a range within which it is possible to authenticate the person P by using the camera 42b and an authentication range 52c that is a range within which it is possible to authenticate the person P by using the camera 42c are the same as the authentication range 52a in shape and size.

In this case, it is possible for the vehicle 1 to sense the person P within the sensing ranges 51a and 51b in the lateral direction of the vehicle 1 and the sensing range 51c in the rear direction of the vehicle 1. It is then possible for the vehicle 1 to authenticate the person P when the person P is within any of the authentication ranges 52a, 52b, and 52c in the lateral direction of the vehicle 1 and the rear direction of the vehicle 1. The sensing range 51a and the sensing range 51b each correspond to an example of a lateral detection range and the sensing range 51c corresponds to an example of a rear detection range.

In the following description, when the sensing ranges 51a, 51b, and 51c are not distinguished, the sensing ranges 51a, 51b, and 51c will be each described as a sensing range 51. Similarly, when the authentication ranges 52a, 52b, and 52c are not distinguished, the authentication ranges 52a, 52b, and 52c will be each described as an authentication range 52.

[2. Configuration of Vehicle Control Apparatus]

FIG. 3 is a block diagram of a control system of the vehicle 1. The control system of the vehicle 1 has a configuration in which each unit of the vehicle 1 is connected to the vehicle control apparatus 100.

The vehicle control apparatus 100 includes a processor 110 and a memory 120. The processor 110 is a computer including, for example, a central processing unit (CPU), a micro controller unit (MCU), and a micro processor unit (MPU). The memory 120 is a rewritable non-volatile storage apparatus and stores a program that is executed by the processor 110 and data that is processed by the processor 110. The memory 120 includes, for example, a semiconductor storage device such as a flash read only memory (ROM) or a solid state disk (SSD), or a magnetic storage device. The memory 120 may include a random access memory (RAN) that forms a work area for temporarily storing a program and data. The vehicle control apparatus 100 may include an integrated circuit (IC) that integrally includes the processor 110 and the memory 120.

The memory 120 which is a non-transitory computer-readable storage medium stores a control program 121 to allow the processor 110 to read the control program 121. The control program 121 is executed by the processor 110. As the data that is processed by the processor 110, the memory 120 stores setting data 122. In addition, the storage region of the memory 120 is provided with a face feature value data base (DB) 123.

The sensing apparatuses 41a, 41b, and 41c are connected to the vehicle control apparatus 100. In addition, the cameras 42a, 42b, and 42c and the notification apparatuses 43a, 43b, and 43c are each connected to the vehicle control apparatus 100. In the following description, when the sensing apparatuses 41a, 41b, and 41c are not distinguished, the sensing apparatuses 41a, 41b, and 41c will be each described as a sensing apparatus 41. Similarly, when it is unnecessary to distinguish the individual apparatuses, the cameras 42a, 42b, and 42c will be each described as a camera 42 and the notification apparatuses 43a, 43b, and 43c will be each described as a notification apparatus 43. The camera 42 corresponds to an example of an image capturing unit, the camera 42a corresponds to an example of a first image capturing unit, the camera 42b corresponds to an example of a second image capturing unit, and the camera 42c corresponds to an example of a third image capturing unit. Among the notification apparatuses 43, the notification apparatus 43a corresponds to an example of a first notification apparatus and the notification apparatus 43b corresponds to an example of a second notification apparatus.

The sensing apparatus 41 senses the person P within the sensing range 51 in accordance with the control of the vehicle control apparatus 100 and outputs a result of the sensing to the vehicle control apparatus 100. The camera 42 shoots an image in accordance with the control of the vehicle control apparatus 100 and outputs the captured image to the vehicle control apparatus 100. The notification apparatus 43 is turned on or blinks in accordance with the control of the vehicle control apparatus 100.

The door operation units 31, 32, 33, 34, and 35 are each connected to the vehicle control apparatus 100. As described above, in the present embodiment, the door operation unit 31 includes the door lock apparatus 31a and the opening and closing apparatus 31b. The door lock apparatus 31a included in the door operation unit 31 sets and releases the door lock of the front door 11 in accordance with the control of the vehicle control apparatus 100. The opening and closing apparatus 31b performs an opening operation and a closing operation on the front door 11 in accordance with the control of the vehicle control apparatus 100. The door operation units 32, 33, 34, and 35 set and release the locks of the respective doors or the rear gate, and perform opening operations and closing operations in accordance with the control of the vehicle control apparatus 100 as with the door operation unit 31. Each of the door locks is an example of the lock of the openable and closeable object.

A door handle sensor 11b is connected to the vehicle control apparatus 100. The door handle sensor 11b is a sensor that is provided to the door handle 11a and senses an operation on the door handle 11a. The door handle sensor 11b includes, for example, a capacitance sensor that senses a contacting operation, a push button switch that is turned on by a pushing operation, or another sensor or switch. The door handle sensors 12b, 13b, 14b, and 15b are sensors that are provided to the respective door handles 12a, 13a, 14a, and 15a and sense operations on the door handles 12a, 13a, 14a, and 15a. The door handle sensors 12b, 13b, 14b, and 15b are each configured, for example, as with the door handle sensor 11b.

When the door handle sensor 11b senses an operation on the door handle 11a, the door handle sensor 11b outputs a sensing signal to the vehicle control apparatus 100. Similarly, when the door handle sensors 12b, 13b, 14b, and 15b respectively sense operations on the door handles 12a, 13a, 14a, and 15a, the door handle sensors 12b, 13b, 14b, and 15b output sensing signals to the vehicle control apparatus 100.

A communication apparatus 29 is connected to the vehicle control apparatus 100. The communication apparatus 29 is an apparatus that communicates with an apparatus outside the vehicle 1 in accordance with the control of the vehicle control apparatus 100. The communication apparatus 29 is a wireless communication apparatus that includes, for example, an antenna which transmits and receives wireless signals, a baseband circuit, an RF circuit, and the like and executes functions of a transmitter and a receiver.

The communication apparatus 29 executes near-field communication. The communication apparatus 29 executes near-field communication that is, for example, compliant with any of Bluetooth (R), Ultra Wide Band (UWB), and another communication scheme. The communication apparatus 29 may be configured to be capable of executing wireless data communication in accordance with a cellular communication scheme such as long term evolution (LTE) or the fifth-generation mobile communication scheme (5G).

The communication apparatus 29 executes near-field communication with a terminal apparatus 2 positioned near the vehicle 1. In addition, the communication apparatus 29 may execute cellular communication and may execute data communication with the terminal apparatus 2 through an unillustrated base station or server.

The terminal apparatus 2 is an apparatus that is used by a person registered as a user of the vehicle 1, and transmits a signal to the communication apparatus 29 by using a near-field communication function. The terminal apparatus 2 is, for example, a smartphone, a tablet computer, or a notebook computer. The terminal apparatus 2 may also be an FOB key.

The sensing apparatus 41, the camera 42, the notification apparatus 43, the door operation units 31, 32, 33, 34, and 35, and the door handle sensors 11b, 12b, 13b, 14b, and 15b each operate by electric power supplied from an unillustrated battery of the vehicle 1. The vehicle control apparatus 100 is capable of performing control to start the supply of electric power to each of the units including the sensing apparatus 41 and the camera 42 and performing control to stop the supply of electric power. For example, the vehicle control apparatus 100 is connected to an unillustrated electric power supply circuit that supplies electric power to each of the units including the sensing apparatus 41 and the camera 42 and configured to perform controls to start and stop the supply of electric power by switching a switch incorporated in the electric power supply circuit.

The processor 110 includes an approach detection section 111, an authentication section 112, a door operation control section 113, and a start control section 116. These components are implemented by the processor 110 executing the control program 121.

The approach detection section 111 detects the person P who approaches the vehicle 1 on the basis of a result of sensing by the sensing apparatus 41. The approach detection section 111 identifies the sensing range 51 within which the person P is sensed among the sensing ranges 51a, 51b, and 51c by identifying the sensing apparatus 41 that senses the person P.

The authentication section 112 executes authentication as to whether or not the person P is a person registered as a user of the vehicle 1 on the basis of an image captured by the camera 42. Determining by the authentication section 112 that the person P is a registered user of the vehicle 1 is referred to as authentication establishment. Authentication failure and authentication non-establishment mean that the authentication section 112 does not determine that the person P is a user of the vehicle 1.

As a specific technique for the authentication section 112 to perform authentication, a variety of publicly known methods are usable. In the present embodiment, an example is demonstrated in which the vehicle control apparatus 100 includes the face feature value DB 123 in the memory 120 and the authentication section 112 performs authentication by using the face feature value DB 123. The face feature value DB 123 is a data base in which a feature value of an image of the face of a person registered as a user of the vehicle 1 is accumulated. The user of the vehicle 1 includes a person who drives the vehicle 1. A person who does not drive the vehicle 1, but gets in the vehicle 1 may be registered as the user.

The authentication section 112 may be configured to be capable of executing processing of registering a user of the vehicle 1. In this case, the authentication section 112 obtains a still image of the face of the user from an image captured by the camera 42 or another camera. The authentication section 112 extracts a region having a general feature value of a face from the obtained still image as the face region. The general feature value of a face is, for example, the shape of the outline of the face, the positions of the eyes and the nose relative to the outline, and another feature. The face region refers to a face image portion of the still image. The authentication section 112 sets a feature point in the face region. For example, the authentication section 112 searches the face region and the authentication section 112 sets a feature point on an eye, an eyebrow, the nose, the outline, or the like. A position at which a feature point is set and the number of feature points are set in advance by the authentication section 112 or decided by algorithm included in the control program 121. The authentication section 112 detects the feature value of a feature point and stores the detected feature value in the face feature value DB 123 in association with the user.

When the authentication section 112 performs authentication, the authentication section 112 obtains an image captured by the camera 42. For example, when the camera 42 shoots a still image, the authentication section 112 obtains the one image captured by the camera 42. In addition, for example, when the camera 42 shoots a moving image, the authentication section 112 obtains the image captured by the camera 42 for each of the frames and uses the image of the one obtained frame as one captured image. This one captured image is a still image.

The authentication section 112 extracts a face region that is an image of a human face from the one obtained captured image. The authentication section 112 sets feature points on the extracted face region as described above and detects the feature value of each of the feature points. The authentication section 112 compares a feature value detected in the captured image and a feature value stored in the face feature value DB 123 and calculates the matching rate between the feature values. The matching rate between the feature values is a so-called matching score. For example, after the authentication section 112 calculates the matching rate between the feature values for each feature point, the authentication section 112 calculates the matching rate of the one captured image on the basis of the calculated matching rate for each of the feature points. The authentication section 112 authenticates the person P as a user of the vehicle 1 on the basis of the matching rate. Specifically, when the matching rate is higher than or equal to a determination threshold set in advance, the authentication section 112 determines that an image captured by the camera 42 includes a candidate for a face image of a user. When the authentication section 112 determines that the image captured by the camera 42 includes a candidate for a face image of a user, the authentication by the authentication section 112 is established.

The authentication section 112 outputs authentication establishment when the matching rate is higher than or equal to the determination threshold in authentication that uses a captured image which is one still image and authentication that uses the image of one frame obtained from a moving image. The authentication section 112 may select a feature value of one person from the feature values stored in the face feature value DB 123 and repeatedly execute, by the number of registered users, processing of making a determination by calculating the matching rate with a feature value detected in a captured image.

The authentication section 112 may execute authentication a plurality of times. In this case, the authentication section 112 obtains the images of a plurality of frames from a moving image that is an image captured by the camera 42 and performs the authentication described above for each of the frames, or obtains a plurality of still images that are images captured by the camera 42 and performs the authentication described above for each of the still images. The authentication section 112 outputs authentication establishment when authentication is established a number of times designated in advance or more in a row. In this case, to output authentication establishment, it is necessary to establish authentication as to the one person P a plurality of times. This makes it possible to increase the level of security.

The door operation control section 113 brings any one or more of the door operation units 31, 32, 33, 34, and 35 into operation to at least release the door locks or perform opening operations on the doors.

The start control section 116 starts the camera 42 when the approach detection section 111 detects the person P. The camera 42 is used for authentication by the authentication section 112.

When the approach detection section 111 detects the person P, the start control section 116 identifies the sensing apparatus 41 that senses the person P. When the sensing apparatus 41a senses the person P, the start control section 116 starts the camera 42a. In addition, when the sensing apparatus 41b senses the person P, the start control section 116 starts the camera 42b. In these cases, timings at which the start control section 116 starts the camera 42a and the camera 42b are, for example, the entry of the person P detected by the approach detection section 111 to the authentication range 52 or immediately before the entry of the person P to the authentication range 52. Specifically, the start control section 116 starts the camera 42 at the timing at which the distance between the person P detected by the approach detection section 111 and the sensing apparatus 41 grows shorter than or equal to the distance R2. For example, the approach detection section 111 controls the sensing apparatus 41 to detect the distance between the sensing apparatus 41 and the person P.

Further, the start control section 116 causes the notification apparatus 43 to issue a notification after the start control section 116 starts the camera 42. The notification apparatus 43 issues a notification for informing the person P that the camera 42 is in operation. For example, when the person P within the sensing range 51a is detected, the start control section 116 starts the camera 42a and further causes the notification apparatus 43a to issue a notification. In addition, for example, when the person P within the sensing range 51b is detected, the start control section 116 starts the camera 42b and causes the notification apparatus 43b to issue a notification.

Incidentally, the person P who is about to get in the vehicle 1 sometimes moves around the vehicle 1 after entering the sensing range 51a or the sensing range 51b. For example, the person P sometimes moves toward the front door 12 on the passenger seat 22 side from the lateral direction of the vehicle 1 on the driver's seat 21 side. In such a case, the start control section 116 starts the camera 42a in response to the sensing of the person P within the sensing range 51a, but it is necessary to start the camera 42b to authenticate the person P who comes closer to the front door 12. Such a case is also possible when the person P goes toward the front door 11. The start control section 116 thus estimates a movement direction after the camera 42a is started of the person P. When the estimated movement direction is a direction away from the front door 11 on the driver's seat 21 side, the start control section 116 starts the camera 42b. In addition, the start control section 116 estimates a movement direction after the camera 42b is started of the person P, and starts the camera 42a when the estimated movement direction is a direction away from the front door 12 on the passenger seat 22 side. This makes it possible to start the camera 42 in response to a motion of the person P moving through the area in the front direction or the rear direction of the vehicle 1 and quickly perform authentication.

As a method for the start control section 116 to estimate the movement direction of the person P, a variety of methods are included. For example, the start control section 116 obtains the trajectory of the movement of the person P in the past on the basis of a temporal change of the position of the person P identified by the approach detection section 111 and estimates the movement direction by extending this trajectory. In addition, for example, the start control section 116 obtains the trajectory of the movement of the person P in the past by analyzing an image captured by the camera 42 and estimates the movement direction by extending this trajectory.

In addition, when the person P is detected within the sensing range 51c including the area in the rear direction of the vehicle 1, the start control section 116 starts the camera 42a or the camera 42b. This makes it possible to quickly execute authentication within the authentication ranges 52a and 52b in the lateral direction of the vehicle 1 in response to the approaching person P.

Figure 4:
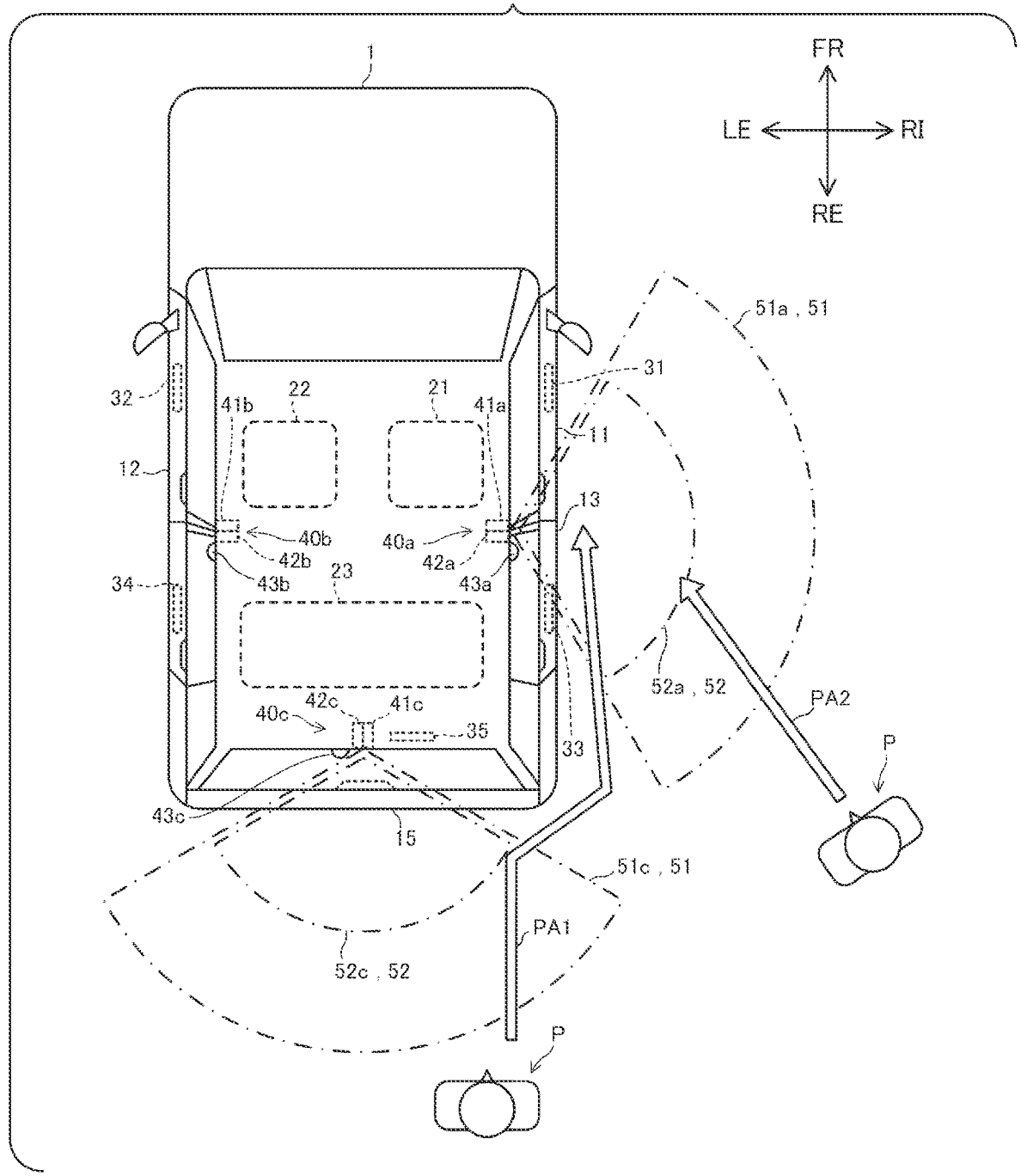
FIG. 4 is an explanatory diagram of a motion of a person.

FIG. 4 is an explanatory diagram of the movement of the person P and a plan view of the vehicle 1 and the person P from the above.

FIG. 4 illustrates a path PA1 and a path PA2 as examples of moving paths of the person P who moves toward the front door 11 from the outside of the vehicle 1.

The path PA1 is a path in which the person P approaches the vehicle 1 from the rear direction of the vehicle 1 and goes toward the front door 11 through an area in the lateral direction of the vehicle 1. The path PA2 is a path in which the person P approaches the front door 11 from the lateral direction of the vehicle 1. No matter which of the path PA1 and the path PA2 the person P uses, the authentication section 112 authenticates the person P by using an image captured by the camera 42*a*.

When the person P moves like the path PA2, the person P has some time until reaching the authentication range 52*a* after the person P is detected within the sensing range 51*a*. This allows the start control section 116 to quickly authenticate the person P as long as the start control section 116 starts the camera 42*a* before the person P reaches the authentication range 52*a*.

Meanwhile, when the person P moves like the path PA1, the person P is detected within the sensing range 51*c* and the person P is then detected within the sensing range 51*a*. The start control section 116 starts the camera 42*a* in response to the detection of the person P within the sensing range 51*a*.

The distance for the person P who enters the sensing range 51*a* to reach the authentication range 52*a* is shorter in the path PA1 than the distance in the path PA2. The person P is thus highly likely to reach the authentication range 52*a* before the camera 42*a* is started if the camera 42*a* is started after the person P is detected within the sensing range 51*a*. This makes it difficult to complete authentication before the person P reaches the front door 11. When the person P is detected within the sensing range 51*c*, the start control section 116 thus starts the camera 42*a* or the camera 42*b* in the present embodiment. Here, the start control section 116 starts the camera 42*a* or the camera 42*b* even when the person P does not approach a position within the distance R2 from the camera 42. In addition, the start control section 116 starts the camera 42*a* or the camera 42*b* even before the person P is detected within the sensing range 51*a* or the sensing range 51*b*. For this reason, the camera 42*a* or the camera 42*b* has been already started before the person P enters the authentication range 52*a* or the authentication range 52*b*, allowing the person P to be quickly authenticated.

When the person P is detected within the sensing range 51*c*, the start control section 116 estimates the movement direction of the person P detected within the sensing range 51*c*. The method for estimating the movement direction of the person P has been described above. When the movement direction of the person P detected within the sensing range 51*c* is a direction toward the driver's seat 21 of the vehicle 1, the start control section 116 starts the camera 42*a*. When the estimated movement direction of the person P is a direction toward the passenger seat 22 of the vehicle 1, the start control section 116 starts the camera 42*b*. This advantageously causes quick transition to an authenticatable state when the person P goes toward the front door 11 or the front door 12 from the rear direction of the vehicle 1.

In addition, when the start control section 116 starts the camera 42*a* on the basis of the estimated movement direction of the person P, the start control section 116 may start the camera 42*b* after the camera 42*a*. Similarly, when the start control section 116 starts the camera 42*b* on the basis of the estimated movement direction of the person P, the start control section 116 may start the camera 42*a* after the camera 42*b*. This makes it possible to quickly perform authentication even when the person P further moves a different direction from the movement direction estimated by the start control section 116.

When the start control section 116 starts the camera 42*a* on the basis of the estimated movement direction of the person P, the start control section 116 causes the notification apparatus 43*a* to issue a notification. Here, when the camera 42*b* is started after the camera 42*a*, the notification apparatus 43*b* issues a notification at the time of the start of the camera 42*b*. In addition, when the start control section 116 starts the camera 42*b* on the basis of the estimated movement direction of the person P, the start control section 116 causes the notification apparatus 43*b* to issue a notification. Here, when the camera 42*a* is started after the camera 42*b*, the notification apparatus 43*a* issues a notification at the time of the start of the camera 42*a*.

After the start control section 116 starts the camera 42, the authentication section 112 obtains an image captured by the started camera 42 and starts authentication. When the authentication section 112 then makes an output indicating that the authentication is established, the door operation control section 113 selects an openable and closeable object. That is, the door operation control section 113 selects the openable and closeable object at the position corresponding to the camera 42 used for the authentication from the front doors 11 and 12, the rear doors 13 and 14, and the rear gate 15. The door operation control section 113 identifies the unit that brings the selected openable and closeable object into operation from the door operation units 31, 32, 33, 34, and 35, and brings the identified unit into operation. This releases the lock of the door of the vehicle 1. In addition, the door operation control section 113 may cause an opening operation of opening the door to be performed.

The sensing apparatus 41 comes into operation with the vehicle 1 parked. Parked refers to a state in which the speed of the vehicle 1 is speed close to 0 or equal to 0 and a driving source of the vehicle 1 is stopped. For example, when the driving source of the vehicle 1 is an engine, the engine is stopped while the vehicle 1 is parked. In addition, for example, when the driving source of the vehicle 1 is a driving motor, the supply of electric power to an inverter circuit or the like that supplies the driving motor with electric power is stopped while the vehicle 1 is parked. Parking the vehicle 1 includes a state in which a function of the vehicle 1 is stopped and specifically includes a state in which the ignition switch of the vehicle 1 is off. In addition, the vehicle 1 may bring the sensing apparatus 41 into operation with the vehicle 1 parked and nobody in the vehicle 1. While the sensing apparatus 41 is in operation, the approach detection section 111 obtains a result of sensing by the sensing apparatus 41 in a predetermined cycle and detects the person P within the sensing range 51 on the basis of the obtained result of sensing.

The sensing apparatus 41 may come into operation with the vehicle 1 stopped. Stopped refers to a state in which the speed of the vehicle 1 is speed close to 0 or equal to 0 and the driving source of the vehicle 1 is in operation. For example, when the driving source of the vehicle 1 is an engine, the engine is in operation while the vehicle 1 is stopped. In addition, for example, when the driving source of the vehicle 1 is a driving motor, an inverter circuit or the like that supplies the driving motor with electric power is energized and the driving motor is operable while the vehicle 1 is stopped.

It is unnecessary to bring the camera 42 into operation before the person P is detected within the sensing range 51, and the start control section 116 thus keeps the camera 42 stopped until the person P is detected within the sensing range 51. The start control section 116 may then stop the supply of electric power to the camera 42. This makes it possible to reduce the amount of electric power to be consumed for the camera 42. In addition, the authentication section 112 may execute controls to start and stop the camera 42.

FIG. 3 illustrates a variety of ECUs included in the vehicle 1 and some of the components of the vehicle 1.

Needless to say, the vehicle 1 can include a component that is not illustrated in FIG. 3. In addition, the vehicle 1 does not have to include all of the components illustrated in FIG. 3. For example, the vehicle 1 does not have to include the door handle sensors 11*b*, 12*b*, 13*b*, 14*b*, and 15*b*.

[3. Operation of Vehicle Control Apparatus]

Each of FIGS. 5, 6, 7 and 8 is a flowchart illustrating an operation of the vehicle control apparatus 100.

Figure 5:
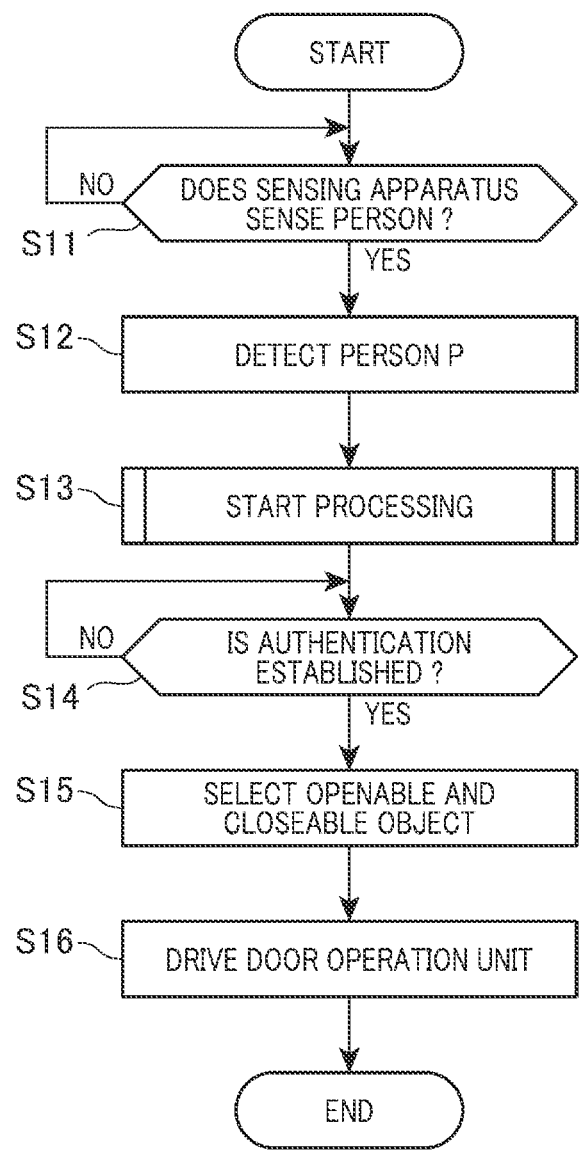
FIG. 5 is a flowchart illustrating an operation of a vehicle control apparatus.

In FIG. 5, the approach detection section 111 executes steps S11 to S12 and the start control section 116 and the authentication section 112 execute step S13. The door operation control section 113 executes steps S14 to S16.

The vehicle control apparatus 100 determines whether or not the sensing apparatus 41 senses the person P by obtaining a result of sensing by the sensing apparatus 41 (step S11). When the sensing apparatus 41 does not sense the person P (step S11; NO), the vehicle control apparatus 100 repeatedly executes step S11 in a predetermined time cycle. When the sensing apparatus 41 senses the person P (step S11; YES), the vehicle control apparatus 100 detects the presence of the person P within the sensing range 51 (step S12).

The vehicle control apparatus 100 executes start processing including processing of starting the camera 42 by the start control section 116 and authentication by the authentication section 112 (step S13). The details of the start processing will be described below with reference to FIGS. 6 to 8.

The vehicle control apparatus 100 determines whether or not authentication is established (step S14) and stands by until authentication is established (step S14; NO). When authentication is established (step S14; YES), the vehicle control apparatus 100 selects an openable and closeable object to be brought into operation from the door operation units 31, 32, 33, 34, and 35 included in the vehicle 1 (step S15). In step S15, the vehicle control apparatus 100 identifies, for example, the camera 42 used for the authentication that is established, and identifies and selects the openable and closeable object that is approached by the person P on the basis of an image captured by the identified camera 42.

The vehicle control apparatus 100 brings a unit into operation that moves the openable and closeable object selected in step S15 from the door operation units 31, 32, 33, 34, and 35 (step S22). This releases the door lock of any of the front doors 11 and 12, the rear doors 13 and 14, and the rear gate 15 or performs an opening operation on any of the front doors 11 and 12, the rear doors 13 and 14, and the rear gate 15.

Figure 6:
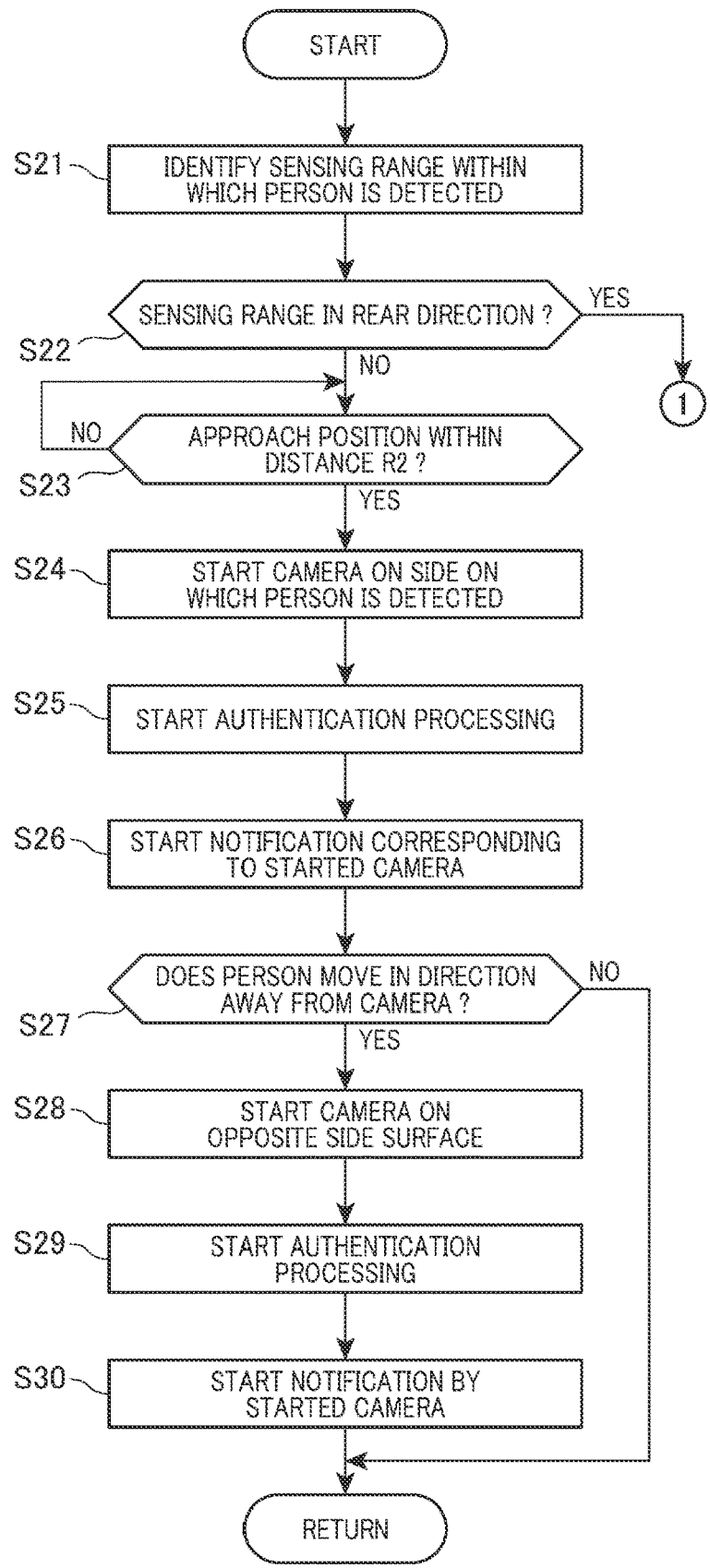
FIG. 6 is a flowchart illustrating an operation of the vehicle control apparatus.
Figure 7:
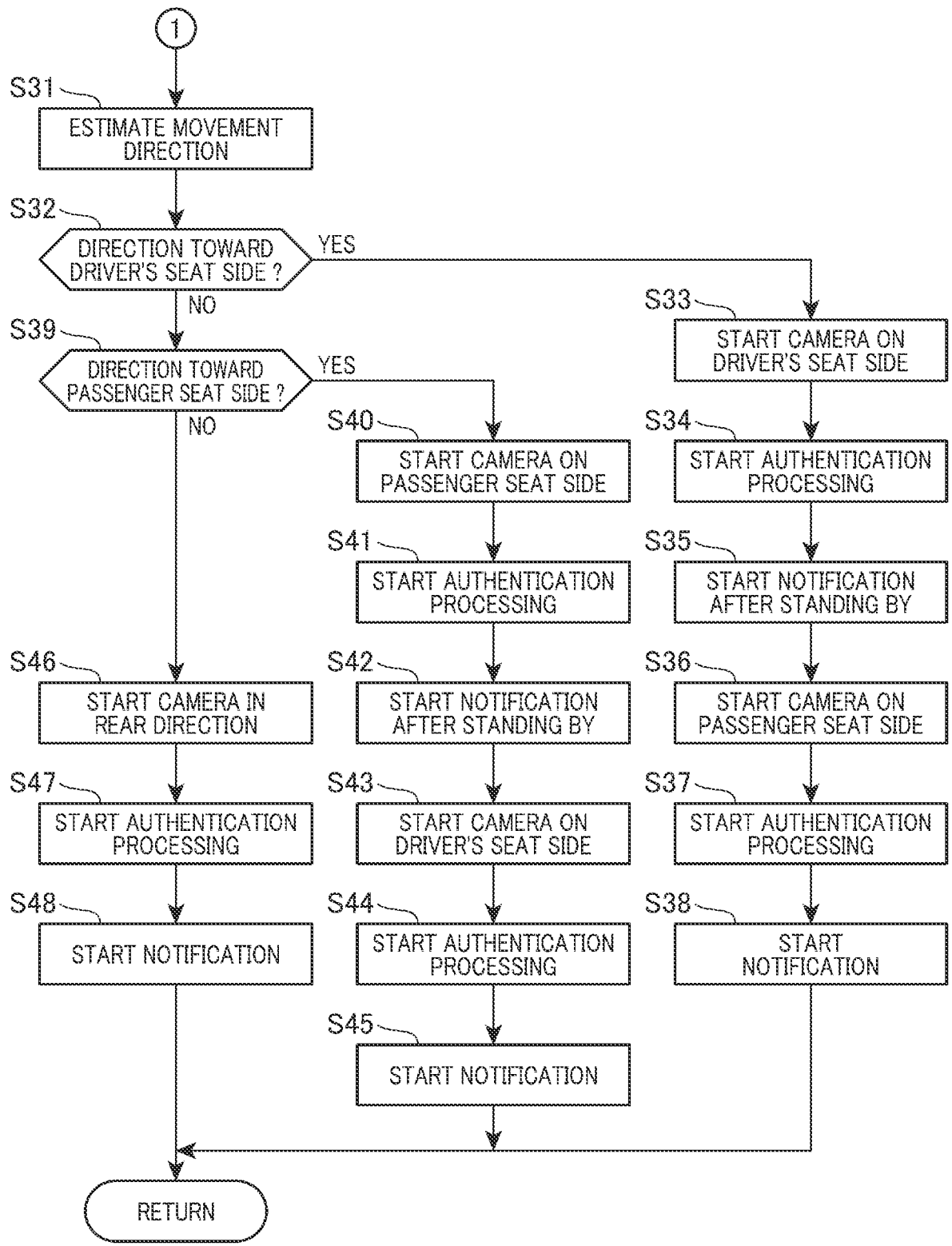
FIG. 7 is a flowchart illustrating an operation of the vehicle control apparatus.

Each of FIGS. 6, 7, and 8 is a flowchart illustrating the determination processing of step S14 in detail. The start control section 116 executes an operation in each of FIGS. 6 and 7 and the authentication section 112 executes an operation in FIG. 8.

The vehicle control apparatus 100 identifies the sensing range 51 within which the person P is sensed (step S21). The vehicle control apparatus 100 determines whether or not the sensing range 51 within which the person P is sensed is the sensing range 51*c* (step S22). When the sensing range 51 within which the person P is detected is the sensing range 51*c* (step S22; YES), the vehicle control apparatus 100 transitions to step S31 in FIG. 7.

When the sensing range 51 within which the person P is detected is not the sensing range 51*c* (step S22; NO), the vehicle control apparatus 100 determines whether or not the person P approaches a position within the distance R2 from the sensing apparatus 41 (step S23). When the person P does not approach the position within the distance R2 from the sensing apparatus 41 (step S23; NO), the vehicle control apparatus 100 stands by.

When the person P approaches the position within the distance R2 from the sensing apparatus 41 (step S23; YES), the vehicle control apparatus 100 starts the camera 42 on the side on which the person P is detected (step S24). Specifically, when the person P is detected within the sensing range 51*a*, the vehicle control apparatus 100 starts the camera 42*a* in step S24. When the person P is detected within the sensing range 51*b*, the vehicle control apparatus 100 starts the camera 42*b* in step S24.

The vehicle control apparatus 100 starts authentication processing that uses an image captured by the camera 42 started in step S24 (step S25). The authentication processing will be described below with reference to FIG. 8. In addition, after the vehicle control apparatus 100 starts the camera 42, the vehicle control apparatus 100 starts a notification by the notification apparatus 43 corresponding to the started camera 42 (step S26). For example, when the camera 42*a* is started in step S24, the vehicle control apparatus 100 starts a notification by the notification apparatus 43*a* in step S26. The vehicle control apparatus 100 may cause the notification apparatus 43 to continuously issue a notification while the camera 42 is in operation. In addition, the vehicle control apparatus 100 may cause the notification apparatus 43 to issue a notification only for a predetermined time from the start of the notification.

The vehicle control apparatus 100 determines whether or not the person P moves in a direction away from the camera 42 started in step S24 (step S27). The vehicle control apparatus 100 monitors the distance from the camera 42 to the person P, for example, after the camera 42 is started in step S24. For example, when the distance from the camera 42 to the person P grows longer, the vehicle control apparatus 100 determines in step S27 that the person P moves in a direction away from the camera 42.

When the person P moves in a direction away from the camera 42 (step S27; YES), the vehicle control apparatus 100 starts the camera 42 disposed on the side surface of the vehicle 1 opposite to the camera 42 started in step S24 (step S28). For example, the camera 42 disposed on the side surface opposite to the camera 42*a* is the camera 42*b*, and vice versa. The vehicle control apparatus 100 starts authentication processing that uses an image captured by the camera 42 started in step S28 (step S29) and starts a notification by the notification apparatus 43 corresponding to the started camera 42 (step S30). The plurality of cameras 42 may execute authentication processing and the plurality of notification apparatuses 43 may issue notifications through the operations in step S29 and step S30. When the person P does not move in a direction away from the camera 42 (step S27; NO), the vehicle control apparatus 100 skips steps S28 to S30. After the operations in FIG. 6 end, the vehicle control apparatus 100 transitions to step S14 in FIG. 5.

In step S31 in FIG. 7, the vehicle control apparatus 100 estimates the movement direction of the person P detected within a sensing range 51*d* (step S31). The vehicle control apparatus 100 determines whether or not the estimated movement direction of the person P is a direction toward the driver's seat 21 (step S32).

When it is determined that the movement direction of the person P is a direction toward the driver's seat 21 (step S32; YES), the vehicle control apparatus 100 starts the camera 42*a* that is the camera 42 on the driver's seat 21 side (step S33). This makes it possible to capture an image of the area within the authentication range 52*a* that is the side surface of the vehicle 1 on the driver's seat 21 side. The vehicle control apparatus 100 starts authentication processing that uses an image captured by the camera 42*a* (step S34).

The vehicle control apparatus 100 stands by for a predetermined time from the start of the camera 42*a* and then starts a notification by the notification apparatus 43*a* (step S35). The standby time for a notification in step S35 is, for example, a time set in advance. Alternatively, the vehicle control apparatus 100 stands by for a notification by the notification apparatus 43*a* in step S35 until the person P is no longer detected within the sensing range 51*c* after the camera 42*a* is started. In this case, after the person P is no longer detected within the sensing range 51*c*, the notification apparatus 43*a* issues a notification.

Subsequently, the vehicle control apparatus 100 starts the camera 42*b* on the passenger seat 22 side (step S36) and starts authentication processing that uses an image captured by the camera 42*b* (step S37). Here, the vehicle control apparatus 100 starts a notification by the notification apparatus 43*b* corresponding to the camera 42*b* (step S38) and transitions to step S14 in FIG. 5.

In the operations in steps S33 to S38, authentication processing that uses an image captured by the camera 42*a* and authentication processing that uses an image captured by the camera 42*b* are started. The authentication section 112 may perform these kinds of authentication processing at the same time. For example, when the authentication section 112 detects an image of the person P in each of an image captured by the camera 42*a* and an image captured by the camera 42*b* and a captured image including the image of the person P is obtained, the authentication section 112 may start authentication.

When it is determined that the movement direction of the person P is not a direction toward the driver's seat 21 (step S32; NO), the vehicle control apparatus 100 determines whether or not the movement direction of the person P is a direction toward the passenger seat 22 (step S39).

When it is determined that the movement direction of the person P is a direction toward the passenger seat 22 (step S39; YES), the vehicle control apparatus 100 starts the camera 42*b* that is the camera 42 on the passenger seat 22 side (step S40). This makes it possible to capture an image of the area within the authentication range 52*b* that is the side surface of the vehicle 1 on the passenger seat 22 side. The vehicle control apparatus 100 starts authentication processing that uses an image captured by the camera 42*b* (step S41).

The vehicle control apparatus 100 stands by for a predetermined time from the start of the camera 42*b* and then starts a notification by the notification apparatus 43*b* (step S42). The standby time for a notification in step S42 is similar to the standby time in step S35 and is a time set in advance or a time necessary until the person P is no longer detected within the sensing range 51*c*.

The vehicle control apparatus 100 starts the camera 42*a* on the driver's seat 21 side (step S43) and starts authentication processing that uses an image captured by the camera 42*a* (step S44). Here, the vehicle control apparatus 100 starts a notification by the notification apparatus 43*a* corresponding to the camera 42*a* (step S45) and transitions to step S14 in FIG. 5.

When the vehicle control apparatus 100 determines that the movement direction of the person P is not a direction toward the passenger seat 22 (step S39; NO), the person P is considered to be moving toward the rear gate 15. In this case, the vehicle control apparatus 100 starts the camera 42*c* that captures an image of the area in the rear direction of the vehicle 1 (step S46). The vehicle control apparatus 100 starts authentication processing that uses an image captured by the camera 42*c* (step S47). Further, the vehicle control apparatus 100 starts a notification by the notification apparatus 43*c* (step S48) and transitions to step S14 in FIG. 5. When the notification apparatus 43*c* starts to issue a notification in step S48, the vehicle control apparatus 100 does not stand by as in steps S35 and S42.

In the operations in steps S33 to S38 and S40 to S45, authentication processing that uses an image captured by the camera 42*a* and authentication processing that uses an image captured by the camera 42*b* are started. The authentication section 112 may perform these kinds of authentication processing at the same time. For example, when the authentication section 112 detects an image of the person P in each of an image captured by the camera 42*a* and an image captured by the camera 42*b* and a captured image including the image of the person P is obtained, the authentication section 112 may start authentication.

As illustrated in FIG. 8, the vehicle control apparatus 100 obtains an image captured by the camera 42 in authentication processing (step S51). In step S51, for example, the vehicle control apparatus 100 obtains one still image or one captured image including one frame as described above. The vehicle control apparatus 100 extracts a face region from the obtained captured image (step S52). The vehicle control apparatus 100 calculates a feature value of the face region (step S53) and performs authentication on the basis of the calculated feature value (step S54). In step S54, for example, as described above, the matching score is calculated between the feature value calculated from the face region and a feature value stored in the face feature value DB 123 and the calculated matching score is compared with the determination threshold.

The vehicle control apparatus 100 determines whether or not the authentication is established (step S55). For example, when the matching score is higher than or equal to the determination threshold, the vehicle control apparatus 100 determines that the authentication is established. When the authentication is not established (step S55; NO), the vehicle control apparatus 100 returns to step S51.

When the authentication is established (step S55; YES), the vehicle control apparatus 100 makes an output indicating that the authentication is established (step S56).

[4. Other Embodiments]

In the embodiment described above, the sensing range 51 and the authentication range 52 are illustrated as fan-shaped ranges that have overlapping centers, but this is an example. The shapes and sizes of the sensing range 51 and the authentication range 52 are not limited to the example illustrated in FIG. 1. In addition, the authentication range 52 does not have to be inside the sensing range 51. In addition, in the embodiment described above, the configuration has been exemplified in which the vehicle 1 includes the three detection units 40*a*, 40*b*, and 40*c* corresponding to the areas in the rear direction and the lateral direction of the vehicle 1, but this is an example. A larger number of detection units may be provided to the vehicle 1. For example, the vehicle 1 may be provided with a detection unit that has the sensing range 51 and the authentication range 52 including the area in the front direction of the vehicle 1. This detection unit may be, for example, a camera or a sensor used for the advanced driver-assistance systems (ADAS) of the vehicle 1, or a camera or a sensor used for a security apparatus of the vehicle 1. In addition, the example has been described in which each of the detection units 40*a* and 40*b* is buried and installed in the outer surface of the center pillar of the vehicle 1 between the front door 11 and the rear door 13, but this is an example. For example, one or both of the detection unit 40a and the detection unit 40b may be installed on the roof of the vehicle 1. In addition, for example, one or both of the detection unit 40a and the detection unit 40b may be buried and installed at positions overlapping with the pillar or positions overlapping with the area near the pillar on the outer surfaces of the front door 11 and the rear door 13.

The operation for authentication described in the embodiment above is an example. For example, the authentication section 112 may perform authentication processing by using images captured by the plurality of cameras 42 among the cameras 42a, 42b, and 42c included in the vehicle 1. Needless to say, it is possible to adopt authentication processing compliant with another method.

FIG. 3 is a schematic diagram in which the configuration of the vehicle control apparatus 100 is divided in accordance with the chief processing contents to facilitate the understandings of the invention according to the present application, but the vehicle control apparatus 100 may be configured in accordance with other division. In addition, the processing of each of the components may be executed by one hardware unit or executed by a plurality of hardware units. The processing illustrated in each of FIGS. 5 and 6 may be executed by one program or executed by a plurality of programs. In addition, the vehicle control apparatus 100 may include one ECU or functions of the vehicle control apparatus 100 may be executed by a plurality of ECUs.

The processing units of the flowchart illustrated in each of FIGS. 5 to 8 result from division compliant with the chief processing contents to facilitate the understandings of the processing by the vehicle control apparatus 100, but the present invention is not limited by the way of the division or the name of the processing units. It is also possible to further divide this processing into more processing units in accordance with the processing contents or further divide this processing to cause one processing unit to include more processing. In addition, the processing order of any of the flowcharts described above is not also limited to the illustrated example.

In the embodiment described above, the vehicle control apparatus according to the present invention is configured by the execution of the control program 121 by the processor 110 of the vehicle control apparatus 100 included in the vehicle 1 and the processor 110 executes the vehicle control method. As another embodiment, the vehicle control apparatus may be configured on a server that communicates with the vehicle 1 by the execution of a vehicle control program by a computer included in the server and the computer may execute the vehicle control method. In this case, a user who approaches the vehicle 1 is authenticated on the basis of a captured image of the area around the vehicle 1 that is transmitted from the vehicle 1 to the server and the user is permitted entry to the vehicle 1.

The control program 121 that is executed by the processor 110 according to the present embodiment is not only configured to be stored in the memory 120, but is also implementable as stored in a non-transitory computer-readable storage medium. As the non-transitory computer-readable storage medium, for example, a magnetic storage apparatus, a magnetic recording medium, an optical recording medium, or a semiconductor memory device is usable. Specifically, portable or stationary recording media such as a flexible disk, a hard disk drive (HDD), a CD-ROM, a DVD, a magneto-optical disk, a flash memory, and a card-shaped recording medium are included. The non-transitory computer-readable storage medium may be a non-volatile storage apparatus such as a RAM, a ROM, or an HDD that is an internal storage apparatus included in a computer including the vehicle control apparatus 100.

[5. Configurations Supported by Embodiments Above]

The embodiments described above are specific examples of the following configurations.

(Configuration 1) A vehicle control apparatus including: an approach detection section configured to detect a person within a rear detection range and a lateral detection range, the rear detection range including an area in a rear direction of a vehicle, the lateral detection range including an area within a range different from the rear detection range; an authentication section configured to authenticate a person detected by the approach detection section as a user of the vehicle by using an image captured by an image capturing unit mounted on the vehicle; and a start control section configured to start, in a case where the approach detection section detects a person within the lateral detection range, the image capturing unit when the person detected within the lateral detection range approaches a position closer than a setting distance from the vehicle, and start, in a case where a person is detected within the rear detection range, the image capturing unit even when a distance between the person detected within the rear detection range and the vehicle is greater than or equal to the setting distance.

The vehicle control apparatus according to Configuration 1 makes it possible to start an image capturing unit at an earlier timing when a user comes closer to a vehicle through an area in a rear direction of the vehicle, and execute authentication by using a captured image. This makes it possible to perform an operation, for example, in accordance with the movement of the user such as completing authentication before the user reaches the vehicle. This makes it possible to bring the vehicle into operation at an appropriate timing in response to the user coming closer to the vehicle and eventually contribute to the development of a sustainable transportation system.

(Configuration 2) The vehicle control apparatus according to Configuration 1, in which the image capturing unit includes a first image capturing unit and a second image capturing unit, the first image capturing unit capturing an image of an area in a lateral direction of the vehicle on a driver's seat side, the second image capturing unit capturing an image of an area in a lateral direction of the vehicle on a passenger seat side, and the start control section estimates a movement direction of the person detected within the rear detection range by the approach detection section, starts the first image capturing unit when the movement direction is a direction toward the driver's seat of the vehicle, and starts the second image capturing unit when the movement direction is a direction toward the passenger seat of the vehicle.

The vehicle control apparatus according to Configuration 2 makes it possible to make a choice from a plurality of image capturing units for use in accordance with to which of a driver's seat side and a passenger seat side a user moves closer. This makes it possible to perform authentication by using a captured image appropriately in response to a motion of the user coming closer to a vehicle.

(Configuration 3) The vehicle control apparatus according to Configuration 2, in which the start control section starts the second image capturing unit after starting the first image capturing unit when the movement direction is the direction toward the driver's seat of the vehicle, and starts the first image capturing unit after starting the second image capturing unit when the movement direction is the direction toward the passenger seat of the vehicle.

The vehicle control apparatus according to Configuration 3 starts a plurality of image capturing units in an appropriate order in accordance with to which of a driver's seat side and a passenger seat side a user moves closer. This makes it possible to perform authentication by using a captured image in response to a motion of the user coming closer to a vehicle.

(Configuration 4) The vehicle control apparatus according to Configuration 2 or 3, in which the start control section is capable of controlling a first notification apparatus and a second notification apparatus, the first notification apparatus being included in the first image capturing unit, the second notification apparatus being included in the second image capturing unit, causes the first notification apparatus to issue a notification at a time of a start of the first image capturing unit and then causes the second notification apparatus to issue a notification, when the movement direction is the direction toward the driver's seat of the vehicle, and causes the second notification apparatus to issue a notification at a time of a start of the second image capturing unit and then causes the first notification apparatus to issue a notification, when the movement direction is the direction toward the passenger seat of the vehicle.

The vehicle control apparatus according to Configuration 4 makes it possible to issue a notification in response to the start of an image capturing unit when making a choice from a plurality of image capturing units for use in accordance with the movement direction of a user. This makes it possible to control a timing of issuing a notification to the user appropriately in response to a motion of the user coming closer to the vehicle.

(Configuration 5) The vehicle control apparatus according to any one of Configurations 2 to 4, in which the image capturing unit includes a third image capturing unit that captures an image of the area in the rear direction of the vehicle, the approach detection section distinguishes and detects a person within a first lateral detection range, a person within a second lateral detection range, and a person within the rear detection range, the first lateral detection range including the area in the lateral direction of the vehicle on the driver's seat side, the second lateral detection range including the area in the lateral direction of the vehicle on the passenger seat side, and the start control section starts the first image capturing unit and the second image capturing unit when the approach detection section detects the person within the rear detection range, starts the first image capturing unit when the approach detection section detects the person within the first lateral detection range, and starts the second image capturing unit when the approach detection section detects the person within the second lateral detection range.

The vehicle control apparatus according to Configuration 5 makes it possible to make a choice from a plurality of image capturing units for use in accordance with the position and the movement direction of a user. This makes it possible to control a timing of issuing a notification to the user appropriately in response to a motion of the user coming closer to the vehicle.

(Configuration 6) The vehicle control apparatus according to Configuration 5, in which, after starting the first image capturing unit and the second image capturing unit when the approach detection section detects the person within the rear detection range, the start control section is triggered by a fact that the person is no longer detected within the rear detection range to cause the first notification apparatus and the second notification apparatus to each issue a notification.

The vehicle control apparatus according to Configuration 6 makes it possible to makes a choice from a plurality of image capturing units for use in accordance with the position and the movement direction of a user and further issue a notification in response to the start of an image capturing unit. For example, when the user moves in the lateral direction of a vehicle from the rear direction, a notification is issued in accordance with a timing of the user coming closer to an area in the lateral direction of the vehicle. This makes it possible to transition to a state in which it is possible to capture an image and issue a notification to the user appropriately in response to a motion of the user coming closer to the vehicle. For example, the user is prevented from feeling strange due to a too early notification.

(Configuration 7) The vehicle control apparatus according to Configuration 5 or 6, in which the start control section causes the first notification apparatus to issue a notification when the approach detection section detects the person within the first lateral detection range, and causes the second notification apparatus to issue a notification when the approach detection section detects the person within the second lateral detection range.

The vehicle control apparatus according to Configuration 7 makes it possible to control a timing of issuing a notification to a user appropriately in response to a motion of the user coming closer to a vehicle.

(Configuration 8) The vehicle control apparatus according to any one of Configurations 2 to 7, in which the start control section estimates a movement direction after the first image capturing unit is started of the person detected by the approach detection section, and starts the second image capturing unit when the estimated movement direction is a direction away from a door of the vehicle on the driver's seat side, and estimates a movement direction after the second image capturing unit is started of the person detected by the approach detection section, and starts the first image capturing unit when the estimated movement direction is a direction away from a door of the vehicle on the passenger seat side.

The vehicle control apparatus according to Configuration 8 makes it possible to perform authentication by using a captured image in accordance with a timing of a user coming closer to a vehicle when the user goes away from a door on a side surface of the vehicle because an image capturing unit corresponding to the opposite side surface is started.

(Configuration 9) A vehicle control method that is executed by a computer, the vehicle control method including: detecting a person within a rear detection range and a lateral detection range, the rear detection range including an area in a rear direction of a vehicle, the lateral detection range including an area within a range different from the rear detection range; starting, in a case where a person is detected within the lateral detection range, an image capturing unit mounted on the vehicle when the person detected within the lateral detection range approaches a position closer than a setting distance from the vehicle, and starting, in a case where a person is detected within the rear detection range, the image capturing unit even when a distance between the person detected within the rear detection range and the vehicle is greater than or equal to the setting distance; and authenticating the person detected within the rear detection range or the lateral detection range as a user of the vehicle by using an image captured by the image capturing unit.

The vehicle control method according to Configuration 9 makes it possible to start an image capturing unit at an earlier timing when a user comes closer to a vehicle through an area in a rear direction of the vehicle, and execute authentication by using a captured image. This makes it possible to perform an operation, for example, in accordance with the movement of the user such as completing authentication before the user reaches the vehicle. This makes it possible to bring the vehicle into operation at an appropriate timing in response to the user coming closer to the vehicle and eventually contribute to the development of a sustainable transportation system.

(Configuration 10) A non-transitory computer-readable storage medium storing a program that is executable by a computer, the program causing the computer to function as: an approach detection section configured to detect a person within a rear detection range and a lateral detection range, the rear detection range including an area in a rear direction of a vehicle, the lateral detection range including an area within a range different from the rear detection range; an authentication section configured to authenticate a person detected by the approach detection section as a user of the vehicle by using an image captured by an image capturing unit mounted on the vehicle; and a start control section configured to start, in a case where the approach detection section detects a person within the lateral detection range, the image capturing unit when the person detected within the lateral detection range approaches a position closer than a setting distance from the vehicle, and start, in a case where a person is detected within the rear detection range, the image capturing unit even when a distance between the person detected within the rear detection range and the vehicle is greater than or equal to the setting distance.

The program according to Configuration 10 makes it possible to start an image capturing unit at an earlier timing when a user comes closer to a vehicle through an area in a rear direction of the vehicle, and execute authentication by using a captured image. This makes it possible to perform an operation, for example, in accordance with the movement of the user such as completing authentication before the user reaches the vehicle. This makes it possible to bring the vehicle into operation at an appropriate timing in response to the user coming closer to the vehicle and eventually contribute to the development of a sustainable transportation system.

REFERENCE SIGNS LIST 1 vehicle
2 terminal apparatus
11, 12 front door
11a, 12a, 13a, 14a, 15a door handle
11b, 12b, 13b, 14b, 15b door handle sensor
13, 14 rear door
15 rear gate
21 driver's seat
22 passenger seat
23 back seat
29 communication apparatus
31, 32, 33, 34, 35 door operation unit
31a door lock apparatus
31b opening and closing apparatus
40a, 40b, 40c detection unit
41, 41a, 41b, 41c sensing apparatus
42 camera (image capturing unit)
42a camera (first image capturing unit)
42b camera (second image capturing unit)
42c camera (third image capturing unit)
43 notification apparatus
43a notification apparatus (first notification apparatus)
43b notification apparatus (second notification apparatus)
43c notification apparatus
51 sensing range
51a sensing range (lateral detection range)
51b sensing range (lateral detection range)
51c sensing range (rear detection range)
52, 52a, 52b, 52c authentication range
100 vehicle control apparatus
110 processor
111 approach detection section
112 authentication section
113 door operation control section (openable and closeable object operation control section)
116 start control section
120 memory
121 control program
122 setting data
123 face feature value DB

What is claimed is:

1. A vehicle control apparatus comprising a processor, a first detection section and a second detection section provided on each of left and right side surfaces in a traveling direction of a vehicle, and a third detection section provided on a rear surface of the vehicle, wherein
   each of the first detection section, the second detection section, and the third detection section includes a sensor or a radar that detects presence of a person outside the vehicle in a predetermined detection range, a camera that captures an image of the person in the detection range, and an illuminant that turns on or blinks while the camera is capturing the image,
   the processor is configured to:
      acquire a detection result of the sensor or the radar, of each of the first detection section, the second detection section, and the third detection section, at a predetermined cycle in a state in which an ignition switch of the vehicle is turned off;
      when the person is detected in a rear of the vehicle which is the detection range of the third detection section, start capturing by the cameras of the first detection section and the second detection section, and turn on or blink the illuminant of the first detection section and the second detection section,
      authenticate a person detected as a user of the vehicle by using the image captured by the camera of the first detection section or the second detection section; and
      when an authentication is established, the camera of the first detection section or the second detection section used for establishing the authentication is identified, a door to be opened and closed is identified based on the image captured by the camera identified, and a release or an opening operation of a door lock of the door identified is performed.

2. The vehicle control apparatus according to claim 1, wherein
   the first detection section detects the person in the detection range in a lateral direction of the vehicle on a driver's seat side, the second detection section detects the person in the detection range in the lateral direction of the vehicle on a passenger seat side, and
   the processor estimates a movement direction of the person detected at the rear of the vehicle, starts the camera of the first detection section when the movement direction is a direction toward the driver's seat of the vehicle, and starts the camera of the second detection section when the movement direction is a direction toward the passenger seat of the vehicle.

3. The vehicle control apparatus according to claim 2, wherein the processor starts the camera of the second detection section after starting the camera of the first detection section when the movement direction is the direction toward the driver's seat of the vehicle, and starts the camera of the first detection section after starting the camera of the second detection section when the movement direction is the direction toward the passenger seat of the vehicle.

4. The vehicle control apparatus according to claim 1, wherein the processor starts the camera of the first detection section when detecting the person within the detection range of the first detection section, and starts the camera of the second detection section when detecting the person within the detection range of the second detection section.

5. The vehicle control apparatus according to claim 2, wherein the processor estimates a movement direction of the person detected by the first detection section, and starts the camera of the second detection section when the estimated movement direction is a direction away from a door of the vehicle on the driver's seat side, and estimates a movement direction of the person detected by the second detection section, and starts the camera of the first detection section when the estimated movement direction is a direction away from a door of the vehicle on the passenger seat side.

6. A vehicle control method that is executed by a computer, the vehicle control method comprising:

detecting a person in a first detection range in a lateral direction of a vehicle on a driver's seat side, in a second detection range in the lateral direction of the vehicle on a passenger seat side, and in a third detection range in a rear of the vehicle, when the person is detected in the third detection range, starting by a first camera an image capturing of the first detection range and by a second camera an image capturing of the second detection range, and turning on or blinking an illuminant which is provided on each of the first camera and the second camera and which notifies the first camera and the second camera are capturing the image, authenticating a person detected as a user of the vehicle by using the image captured by the first camera or the second camera; and when an authentication is established, identifying the camera used for establishing the authentication, identifying a door to be opened and closed based on the image captured by the camera identified, and performing a release or an opening operation of a door lock of the door identified.

7. A non-transitory computer-readable storage medium storing a program that is executable by a computer to:

detect a person in a first detection range in a lateral direction of a vehicle on a driver's seat side, in a second detection range in the lateral direction of the vehicle on a passenger seat side, and in a third detection range in a rear of the vehicle, when the person is detected in the third detection range, start capturing an image by a first camera that captures the first detection range and a second camera that captures the second detection range, and turn on or blink an illuminant which is provided on each of the first camera and the second camera and which notifies the first camera and the second camera are capturing the image, authenticate a person detected as a user of the vehicle by using the image captured by the first camera or the second camera; and when an authentication is established, identify the camera used for establishing the authentication, identify a door to be opened and closed based on the image captured by the camera identified, and perform an release or opening operation of a door lock of the door identified.

* * * * *